(12) United States Patent
Kosowsky et al.

(10) Patent No.: US 6,651,028 B2
(45) Date of Patent: Nov. 18, 2003

(54) MULTI-PURPOSE SENSOR AND DATA LINK

(75) Inventors: Lester H. Kosowsky, Stamford, CT (US); Richard Gryzbowski, Corning, NY (US)

(73) Assignee: Otis Elevator Company, Farmington, CT (US)

( * ) Notice: Subject to any disclaimer, the term of this patent is extended or adjusted under 35 U.S.C. 154(b) by 49 days.

(21) Appl. No.: 10/015,511

(22) Filed: Dec. 13, 2001

(65) Prior Publication Data

US 2003/0115015 A1 Jun. 19, 2003

(51) Int. Cl.$^7$ ............................ G01C 22/00; G01S 13/00
(52) U.S. Cl. ........................ 702/159; 702/142; 702/143; 342/42
(58) Field of Search ................. 702/140, 142, 702/143, 149, 150, 159, 70–75; 342/42, 44, 50, 51; 340/870.18, 870.25, 870.26, 989–993

(56) References Cited

U.S. PATENT DOCUMENTS

| | | | | |
|---|---|---|---|---|
| 3,314,066 A | * | 4/1967 | Schwartz et al. | 342/27 |
| 4,686,534 A | * | 8/1987 | Eddy | 342/165 |
| 5,929,779 A | * | 7/1999 | MacLellan et al. | 340/10.2 |
| 6,177,861 B1 | * | 1/2001 | MacLellan et al. | 340/10.1 |

* cited by examiner

*Primary Examiner*—Bryan Bui
(74) *Attorney, Agent, or Firm*—Wall Marjama & Bilinski LLP

(57) ABSTRACT

Modulating digital data onto a carrier frequency and then amplitude modulating the result with a waveform of a different frequency permits measuring position and velocity of an elevator cab while transmitting digital data to the cab.

8 Claims, 2 Drawing Sheets

MULTI-PURPOSE SENSOR AND DATA LINK

FIELD OF THE INVENTION

This invention pertains to the field of elevators, and in particular, to determining the absolute position and velocity of a moving elevator car.

BACKGROUND OF THE INVENTION

To stop an elevator smoothly and level with a landing, the system must know when to initiate the stop, when to go into a leveling mode, and when to begin opening the elevator car doors. To perform these functions, it is necessary to know the exact position and velocity of the car at all times. A requirement has arisen to communicate with the car during the course of its travel and to transmit and receive commands and passenger data for automated vehicle applications. In the past, individual sensors have been developed for each requirement, resulting in the development of sensors without regard to operating frequency, commonality, and reliability.

SUMMARY OF THE INVENTION

Briefly stated, modulating digital data onto a carrier frequency and then amplitude modulating the result with a waveform of a different frequency permits measuring position and velocity of an elevator cab while transmitting digital data to the cab.

According to an embodiment of the invention, a method for determining range and velocity of an object compared to a station includes the steps of: (a) providing a reflector on the object; (b) modulating digital data at the station onto a first waveform using one of phase modulation and frequency modulation to produce a first output; (c) amplitude modulating the first output with a second waveform to produce a second output; (d) transmitting the second output from the station to the object, wherein a return signal is generated by a portion of the second output being reflected from the reflector; (e) receiving the return signal at the station and processing the return signal to obtain the range and the velocity of the object; and (f) processing the second output at the object to recover the digital data modulated onto the first waveform at the station.

According to an embodiment of the invention, a system for determining range and velocity of an object compared to a station includes means for providing a reflector on the object; means for modulating digital data at the station onto a first waveform using one of phase modulation and frequency modulation to produce a first output; means for amplitude modulating the first output with a second waveform to produce a second output; means for transmitting the second output from the station to the object, wherein a return signal is generated by a portion of the second output being reflected from the reflector; means for receiving the return signal at the station and processing the return signal to obtain the range and the velocity of the object; and means for processing the second output at the object to recover the digital data modulated onto the first waveform at the station.

DETAILED DESCRIPTION OF THE PREFERRED EMBODIMENT

Figure 1:
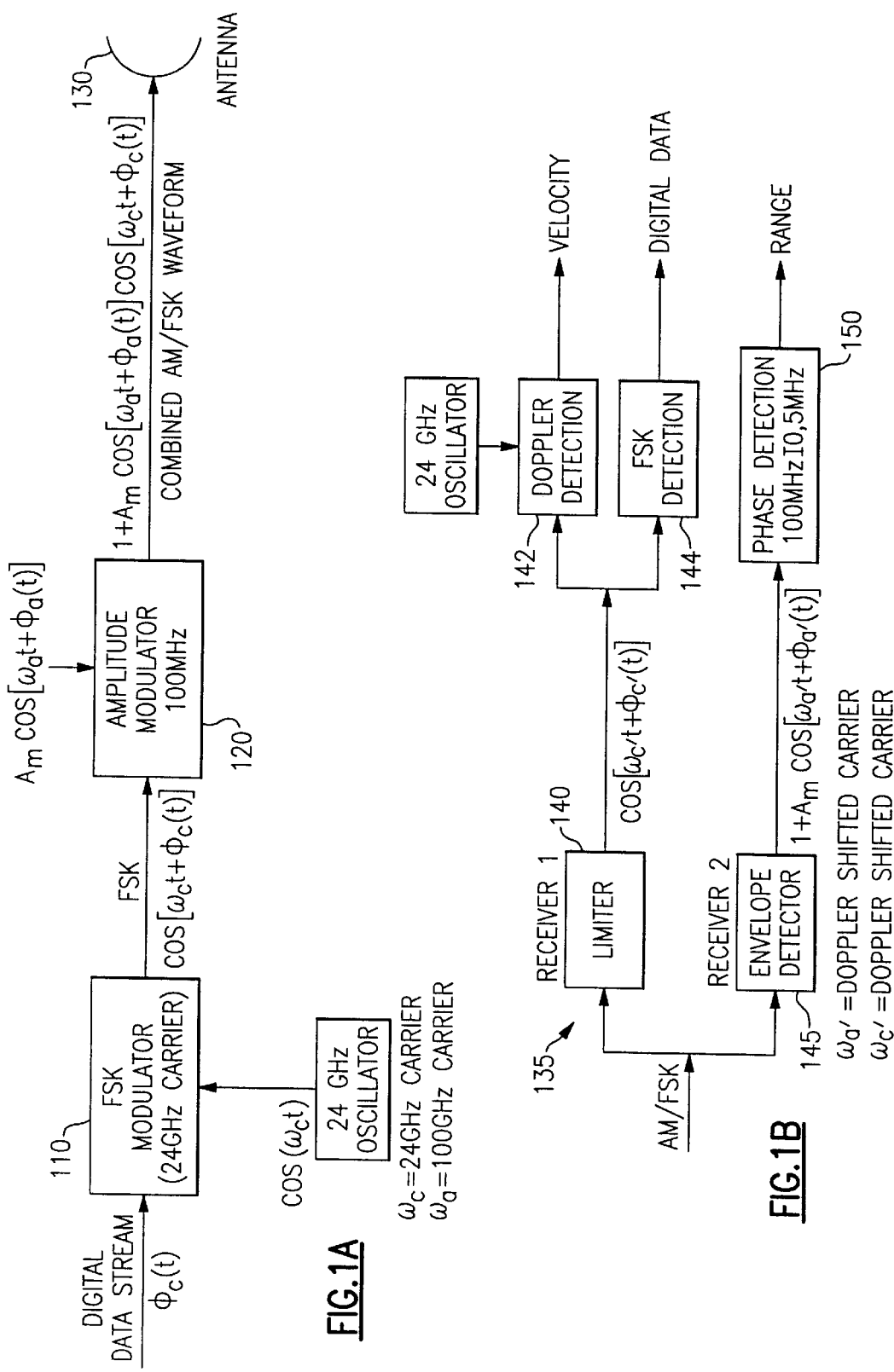
FIG. 1A shows a transmitter subsystem of an embodiment of the present invention.
FIG. 1B shows a receiver subsystem of an embodiment of the present invention.

The invention presents a technique to measure velocity, position, and transmit digital data within an elevator system.

Velocity Measurement

The measurement of velocity using electromagnetic waves is almost always based on the shift in frequency which occurs for a reflected wave when it encounters a moving object (Doppler Effect). The Doppler shift is given by $f_d = 2v/\lambda$, where v is the radial velocity and $\lambda$ is the wavelength of the radiation. The sensitivity of $f_d$ with respect to v is given as $df_d/dv = 2/\lambda$. Thus, for accurate measurement of the radial velocity, $\lambda$ should be as small as practical and the radiation frequency as high as practical. For an operating frequency of 24 GHz and $\lambda$=12 mm, and $df_d/dv$=167 Hz/meter/second.

Position Measurement

Most high accuracy position sensors use the phase of the transmitted and received signals to measure the range, R, to a target. If a single frequency is used, the phase difference between the transmitted and received waves is given as:

$\Delta\Phi = 2\pi f_0 T$, where T=2R/c and $f_0 = c/\lambda$ and c is the speed of light.

Substituting, we obtain $\Delta\Phi = 4\pi R/\lambda$. Since the unambiguous phase is $2\pi$, the unambiguous range to the target is restricted to one-half wavelength of the radiation. At the X-band, 10 GHz, the unambiguous range is only 1.5 cm. It is apparent that for operation in an elevator environment where the required range capability is 150 meters, a single frequency system is inadequate.

In order to avoid the limitations imposed by the single frequency sensor, a two-frequency sensor can be configured which results in an unambiguous range equal to one half wavelength at the difference frequency. For such a system, the unambiguous range is given by $R = c\Delta\Phi/4\pi\Delta f$, where $\Delta f$ is the difference frequency between the two transmitted carriers. Since $\Delta\Phi$ cannot exceed $2\pi$ for unambiguous operation, the maximum unambiguous range is equal to one half wavelength at the difference frequency. For $\Delta f$=1 MHz, the maximum unambiguous range is 150 meters, which is adequate for most elevator hoistways.

Digital Data Transmission

"Modulation" refers to superimposing an information signal onto another signal for transmission. Digital data can be transmitted via three forms of modulation, namely amplitude modulation (AM), frequency modulation (FM), and phase modulation (PM). Within each category of modulation, various techniques exist which permit generating ones and zeros to correspond to the information signal data stream. One of the more popular and robust forms of frequency modulation for digital data is frequency shift keying (FSK), in which the carrier frequency is varied between two discrete frequencies, one of which denotes "one" and the other "zero." Transmitting digital data while determining position and velocity requires a coherent frequency source.

Combined System

The requirements for velocity measurement impose a frequency choice of 10 GHz or higher, while the requirements for position measurement imposes two carrier frequencies separated by 1 MHz to allow an unambiguous measurement range of 150 meters. Sufficiently rapid digital data transmission requires at least 10 Mb/s transmission speed. Selecting the frequency involves both technical and operational considerations. A number of factors favoring 24 GHz as a good choice for the operating frequency include low cost components, a 250 MHz allowable bandwidth, its availability in most European, Pacific Rim, and North American countries, and the fact that it is within an already designated industrial frequency band. Disadvantages include higher noise figures, less sensitive phase detection, and cost tradeoffs.

Since both high ranging accuracy and Doppler sensitivity are required, a system is required that incorporates two integrated carriers, preferably a 100 MHz carrier modulated onto a 24 GHz carrier. The coherence of the 24 GHz carrier is preserved in order to obtain a Doppler measurement of the target velocity. Preserving this coherence also permits the transmission of digital data. As noted above, digital data can be transmitted by three forms of modulation: amplitude modulation, frequency modulation, and phase modulation. Within each category of modulation, various techniques exist which permit generating ones and zeros corresponding to a signal data stream. A frequency modulation or a phase modulation waveform can be integrated into a position & Doppler waveform without impacting the performance of either waveform. Thus, if FSK modulation is integrated into the 24 GHz carrier, and the result amplitude modulated with a 100 MHz +/−0.5 MHz waveform, the capability exists to measure position and velocity while transmitting digital data. In like manner, taking a "two frequency" coherent radar which measures velocity and position, such as the Eaton/Vorad system, while amplitude modulating the waveform allows us to carry digital data. The FSK approach has the potential for greater ranging accuracy and is therefore the preferred implementation.

Referring to FIGS. 1A and 1B, an implementation of an FSK carrier-on-carrier system incorporating the features required for the multi-purpose sensor of the present invention is shown in block diagram form. The system is divided into two subsystems, namely, the transmitter subsystem of FIG. 1A and the receiver subsystem of FIG. 1B. The transmitter subsystem is essentially an FSK modulator having characteristics similar to an International Microwave Corporation Alpha 23-T1 system having the characteristics as set forth in Table 1.

TABEL 1

| | |
|---|---|
| Frequency | 21.2–23.6 GHz |
| Type | Gunn Diode Oscillator |
| Power Output | 50 mW |
| Frequency Stability | +/− 0.03% |
| Frequency Tuning | Continuous |

The digital data stream $\phi_c(t)$ enters an FSK modulator 110 where the data stream is modulated with a modulation signal $\cos(\phi_c t)$. The output of FSK modulator 110 is fed to an amplitude modulator 120 whose percent modulation is preferably no greater than 50%. Such a modulator can be constructed using PIN diodes to act as a variable attenuator. The PIN diode modulator, which is driven by the output of the ranging system at a frequency of 100 MHz +/−0.5 MHz, constitutes the second carrier in the carrier-on-carrier waveform. The output of modulator 120 is buffered and sent to a parabolic antenna 130 for transmission.

On the receiving side, the waveform (labeled AM/FSK in FIG. 1B) is received by an FSK receiver 135 and split into two receiving detectors: an FM detector 140 with a limiter, and an AM detector, e.g., an envelope detector 145. FSK receiver 135 preferably has the characteristics shown in Table 2.

TABLE 2

| | |
|---|---|
| Type | super Heterodyne, dual conversion, limiter front end |
| IF (Intermediate Frequency) | 250 MHz and 70 MHz |
| Frequency Stability | AFC controlled |
| Frequency Tuning | tuned cavity |
| Noise figure | Type |
| Bandwidth | 7 MHz |

The output of FM detector 140 is further processed by a Doppler detection block 142 to obtain the velocity and an FSK detection block 144 to obtain the digital data.

Envelope detector 145 acts to strip the 100 MHz +/−0.5 MHz carrier from the 24 GHz FSK carrier for subsequent Doppler measurement and phase detection in blocks. Preferable characteristics of detector 145 are shown in Table 3.

TABLE 3

| | |
|---|---|
| Type | diode |
| IF | 70 MHz |
| Bandwidth | 2 MHz |

The output of envelope detector 145 goes into a phase detector 150. Phase detector 150 measures the phase difference between the two phase coherent 100 MHz carriers to obtain the range to the target. Preferable characteristics of detector 150 are shown in Table 4.

TABLE 4

| | |
|---|---|
| Type | Coherent, product demodulator |
| IF | 70 MHz |
| Sensitivity | λ/1000, 0.36 degrees |

Note:
since λ = 3 meters at 100 MHz, system sensitivity is 3 mm.

Figure 2:
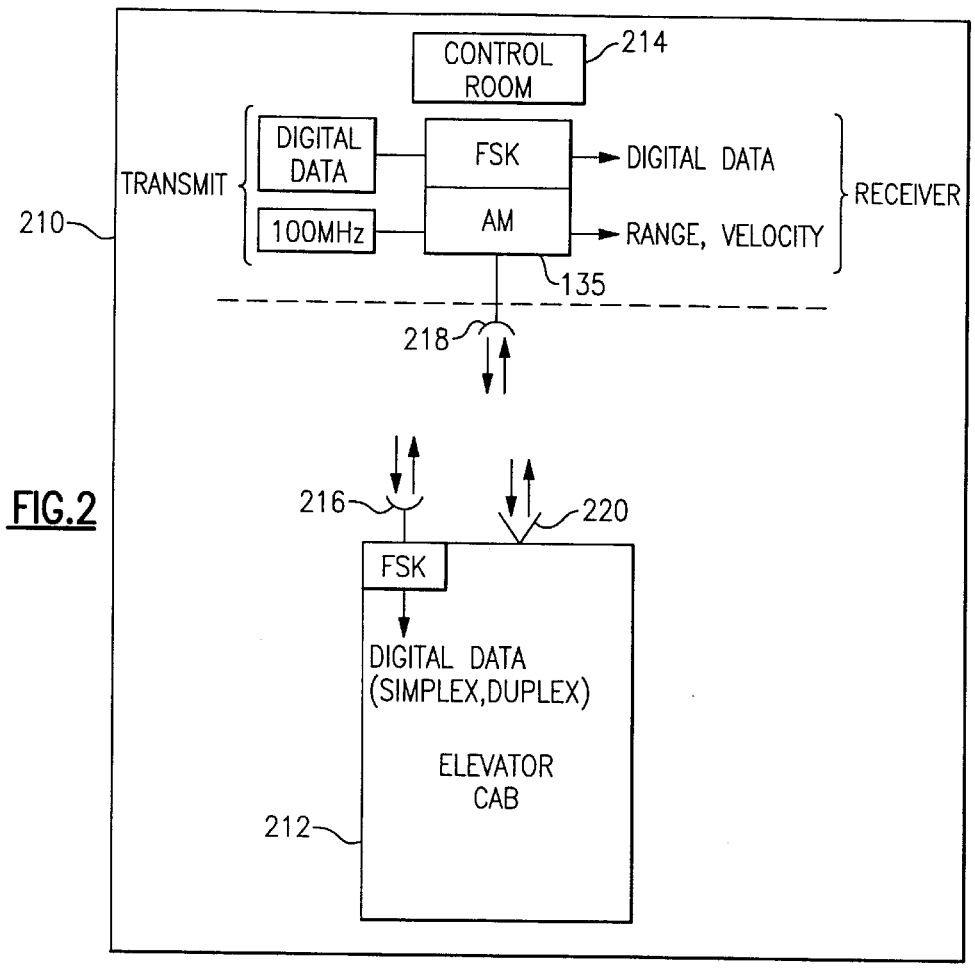
FIG. 2 shows a stylized diagram of an elevator hoistway employing the present invention.

Referring to FIG. 2, a stylized elevator hoistway 210 is shown, in which an elevator cab 212 communicates with a control room 214. A transmit/receive antenna 216, preferably a parabolic or horn antenna, on elevator cab 212 sends and receives signals to/from a similar transmit/receive antenna 218 at control room 214 at the top of hoistway 210. A reflector 220 is also preferably on elevator cab 212. There are two basic functions required of antenna 216 and reflector 220 located on elevator cab 212 and antenna 218 located at control room 214 at the top of the elevator shaft. Antenna 218 is the main transmitter, while antenna 216 is required for simplex or duplex operation. Reflector 220 is required for determining the range and velocity using the 100 MHz carrier. Thus, the necessary data is transmitted to and from elevator cab 212 while the range and velocity information is obtained at control room 214. Antennas 216, 218 are available from vendors such as MA/COM in Deerfield, Mass.

In control room 214, digital data is modulated onto the FSK carrier, preferably 24 GHz, and then amplitude modulated by the low frequency carrier, preferably 100 MHz, for transmission to elevator cab 212. Upon reflection from reflector 220, the Doppler shifted composite signal is received by antenna 218 and processed by FSK receiver 135, where the velocity and range are derived. In duplex operation, digital data from elevator cab 212 is extracted by FSK receiver 135. In elevator cab 212, digital data is received in the cab (simplex) or received and transmitted (duplex).

Figure 3:
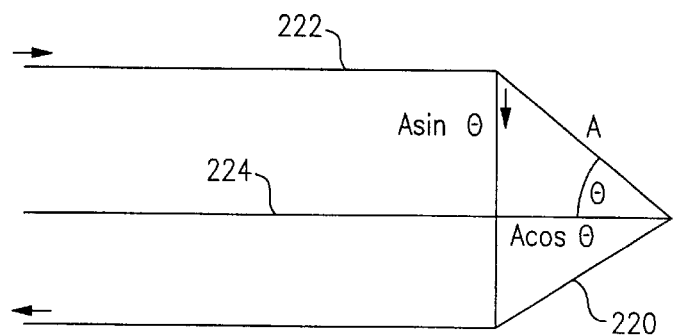
FIG. 3 shows a dihedral reflector used with an embodiment of the present invention.

Referring to FIG. 3, reflector 220 is preferably a corner (dihedral) reflector specifically designed for this invention. The application of remote range measurement to an elevator requires a measurement accuracy better than 5 mm. For this purpose, a corner reflector placed on the roof of elevator cab 212 is selected as the preferable prominent scatterer. However, the precise measurement of the range to the phase center of a corner reflector requires knowing the relationship between the physical shape of the reflector and its electrical phase center. The following explains how the location of the phase center is derived and the incremental range incorporated into the range measurement.

The phase center of an aperture is that point from which the radiation appears to emanate. For a flat reflector, the phase center is on the surface of the reflector such that the range to the phase center and the range to the reflecting surface are the same. In the case of a corner reflector, reflections from internal surfaces increase the apparent range of the phase center from the mouth of the aperture which necessitates calculating the increased range vis a vis the aperture location.

The total reflection range must take into account the added path length introduced by the corner reflector sides. In FIG. 3, the total path length for an extreme ray 222 is given by Path Length=$2R+2A\sin\Theta$ where A is the side dimension, $\Theta$ is the wedge half angle, and R is the range to the aperture face. In a similar manner, the path length for a central ray 224, i.e., the ray to the apex, is given by Path Length=$2R+2A\cos\Theta$. In order to create an equiphase surface at the mouth of reflector 220, the path lengths for each ray must be identical. Thus, $\cos\Theta=\sin\Theta$ and $\Theta=45$ degrees. From the first path length equation, the incremental range is given as $\Delta R=A\sin\Theta$ and $\Delta R=0.707A$. That is, the effective location of a corner reflector when measured from the mouth of the reflector is increased by 0.707A, where A is the length of the side. This range is equal to that of the apex of the dihedral.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for determining a range and a velocity of an object compared to a station while communicating data therebetween, comprising the steps of:

providing a reflector on said object;

modulating digital data at said station onto a first waveform using one of phase modulation and frequency modulation to produce a first output;

amplitude modulating said first output with a second waveform to produce a second output comprising a carrier-no-carrier signal;

transmitting said second output from said station to said object;

generating a return signal by reflecting a first portion of said second output from said reflector;

receiving said return signal at said station and processing said return signal to obtain said range and said velocity of said object; and processing a second portion of said second output at said object to recover said digital data modulated onto said first waveform at said station.

2. A method according to claim 1, further comprising the steps of:

modulating digital data at said object onto said first waveform using one of base modulation and frequency modulation to produce a third output;

transmitting said third output from said object to said station; and processing said third output at said station to recover said digital data modulated onto said first waveform at said object.

3. A method according to claim 2, wherein said object is disposed at a top of an elevator cab and said station is disposed at a top of an elevator hoistway.

4. A method according to claim 1, wherein said object is disposed at a top of an elevator cab and said station is disposed at a top of an elevator hoistway.

5. A system for determining a range and a velocity of an object compared to a station and for communicating data therebetween, comprising:

reflector disposed on said object for reflecting a signal;

a first modulator for modulating digital data at said station onto a first waveform using one of phase modulation and frequency modulation to produce a first output;

a second modulator for amplitude modulating said first output with a second waveform to produce a second output comprising a carrier-on-carrier signal;

a transmitter for transmitting said second output from said station to said object;

a receiver at said station for receiving a return signal comprising a reflected first portion of said second output and processing said return signal to obtain said range and said velocity of said object; and a processor for processing a second portion of said second output at said object to recover said digital data modulated onto said first waveform at said station.

6. A system according to claim 5, further comprising:

means for modulating digital data at said object onto said first waveform using one of phase modulation and frequency modulation to produce a third output;

means for transmitting said third output from said object to said station; and means for processing said third output at said station to recover said digital data modulated onto said first waveform at said object.

7. A system according to claim 6, wherein said object is disposed at a top of an elevator cab and said station is disposed at a top of an elevator hoistway.

8. A system according to claim 5, wherein said object is disposed at a top of an elevator cab and said station is disposed at a top of an elevator hoistway.

* * * * *

UNITED STATES PATENT AND TRADEMARK OFFICE
CERTIFICATE OF CORRECTION

PATENT NO. : 6,651,028 B2  Page 1 of 1
DATED : November 18, 2003
INVENTOR(S) : Kosowsky et al.

It is certified that error appears in the above-identified patent and that said Letters Patent is hereby corrected as shown below:

Column 6,
Line 13, after the phrase "waveform using one of" please delete the word "base" and replace with the word -- phase --.

Signed and Sealed this

Thirtieth Day of March, 2004

JON W. DUDAS
*Acting Director of the United States Patent and Trademark Office*